United States Patent [19]
Rogers

[11] 3,903,618
[45] Sept. 9, 1975

[54] GLOBE STAND AND MEASURING DEVICE

[75] Inventor: Richard K. Rogers, Falls Church, Va.

[73] Assignee: National Geographic Society, Washington, D.C.

[22] Filed: Sept. 12, 1974

[21] Appl. No.: 505,277

[52] U.S. Cl. .............................................. 35/46 R
[51] Int. Cl. ........................................... G09b 27/08
[58] Field of Search ................... 35/46 R, 46 A, 47

[56] References Cited
UNITED STATES PATENTS

| 247,811 | 10/1881 | Eichens | 35/47 |
| 1,196,108 | 8/1916 | Harbeck | 35/46 A |
| 1,740,022 | 12/1929 | Kamei et al. | 35/46 R |
| 2,060,777 | 11/1936 | Haardt | 35/46 R |
| 2,405,418 | 8/1946 | Kukal | 35/46 R |
| 2,422,101 | 6/1947 | Johannsen | 35/46 R |
| 3,100,353 | 8/1963 | Chamberlin | 35/46 R |

*Primary Examiner*—Wm. H. Grieb
*Attorney, Agent, or Firm*—Dos T. Hatfield

[57] ABSTRACT

A combined globe stand and measuring device is comprised of a C-shaped globe clasping and measuring band this is removably secured to a supporting base so that the globe may be clasped by the band and supported by the base or, alternatively, the band and clasped globe may be removed from the stand for desired hand manipulation of the globe and measuring band as an overlay. The C-shaped measuring band is preformed of resilient material with a radius of curvature slightly less than the radius of the globe to be clasped and is provided with suitable measuring indicia thereon.

8 Claims, 6 Drawing Figures

PATENTED SEP 9 1975 3,903,618

3,903,618

GLOBE STAND AND MEASURING DEVICE

BACKGROUND OF THE INVENTION

Combined globe stands and measuring devices for educational and amusement purposes are well known, as shown by U.S. Pat. No. 3,100,353, assigned to the National Geographic Society. It is, of course, to be desired that the devices be simple and economical to manufacture and to be readily disassembled for shipment. Also, the devices should be attractive. It has been found that the arrangement should be such as to facilitate handling the globe and measuring device separate from the supporting stand structure when desired, since it is desirable that some measuring indicia be provided in the vicinity of the stand on cooperating portions of the band when used as a measuring overlay.

PRIOR ART

The following listed U.S. patents show globe measuring and supporting devices with bands clasping the globe and permanently secured to supporting base structures:

2,060,777
2,405,418

To applicant's knowledge, there are no prior patents that disclose the arrangement of the present invention in which the globe clasping band and the supporting base therefor are provided with interfitting and cooperating surfaces to enable the band with clasped globe to be easily removed from the supporting base so that measuring indicia in the vicinity of the interfitting and cooperating surfaces may be easily used with the band functioning as a measurement overlay.

SUMMARY OF THE INVENTION

According to the invention, the C-shaped globe clasping and measuring band is formed of resilient material such as a transparent plastic having a radius of curvature slightly less than the radius of the globe to be clasped. The plane of the plastic band, in a presently preferred embodiment, is also provided with a curvature approximating the curvature of the globe to be clasped so that the band, when clasping a globe, closely interfits and overlays the surface of the globe to permit smooth and close movement around the globe when seeking the desired measurements. A portion of the band, such as either or both end portions, is provided with interfitting surfaces to engage complementary interfitting surfaces of a supporting base structure in a manner to removably support the band with a clasped globe in upright position on the stand or base structure. In the preferred embodiment, the interfitting surfaces of band and base are designed with a snap-fit engagement. The band is provided with suitable measuring indicia, which in the case of a transparent band material, may be overlying portions of the clasped globe that are visible through the band and, since the globe and band are removable from the stand, may be located in the vicinity of the stand engaging cooperating portions of the band.

Other features and advantages of the invention will be apparent with reference to the following detailed description and drawings.

DETAILED DESCRIPTION OF THE INVENTION

Figure 1:
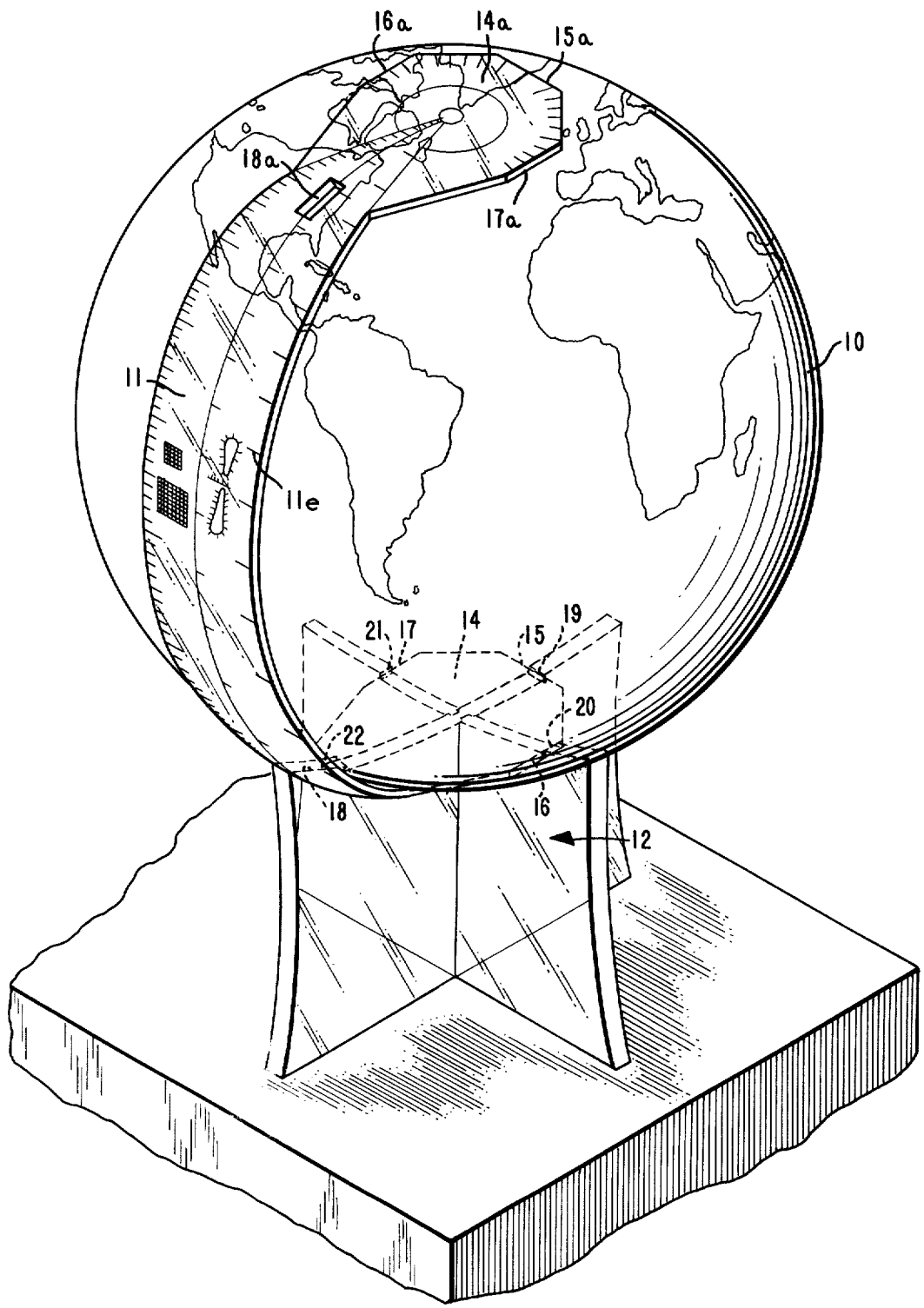
FIG. 1 is a perspective elevation showing the measuring band clasping a globe and removably secured to a supporting stand.

Referring to FIG. 1 of the drawings, a world globe 10 is shown to be clasped by the C-shaped globe retaining and measuring band 11 that is removably supported on the base member 12 in a generally upright position. The C-shaped retaining band 11 is preformed of resilient material with a radius of curvature slightly less than the radius of the globe 10 so that the globe may be removably retained and clasped by the retaining and measuring band 11. A portion of the retaining band 11, such as either or both end portions as shown at 14 or 14a, is provided with cooperating surfaces 15–18, or 15a–18a, interfitting with cooperating surfaces 19–22 of the base member 12 so that the band 11, with or without a clasped globe 10 may be removably supported on the base member 12.

Figure 2:
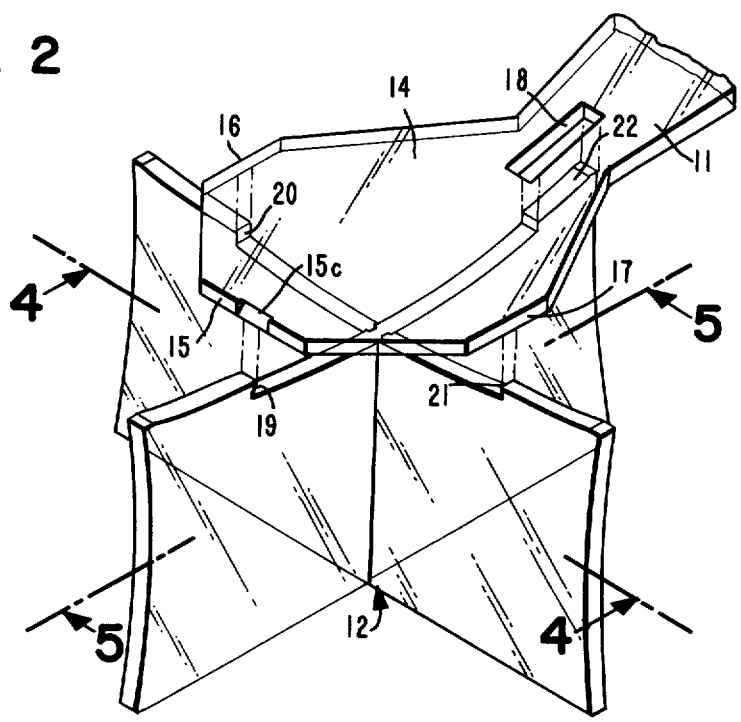
FIG. 2 is a fragmentary perspective showing the assembled stand and a portion of the measuring band as separated from the stand.
Figure 4:
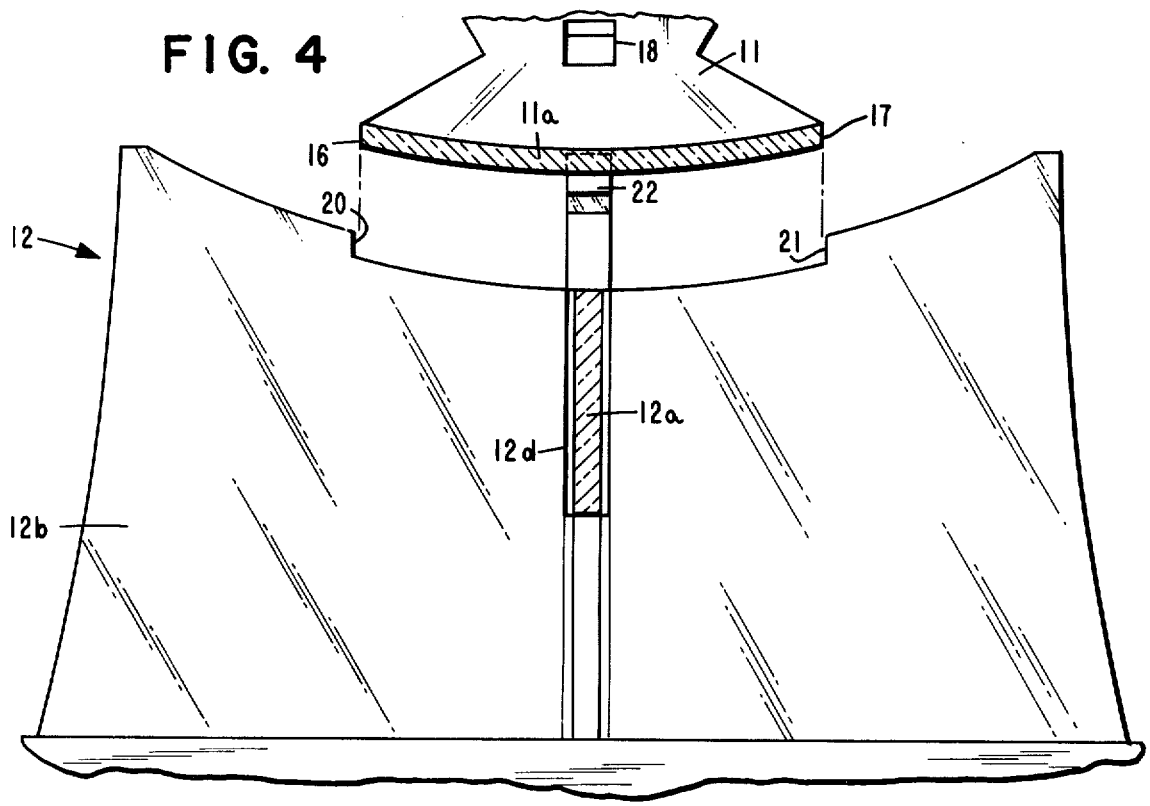
FIG. 4 is a section on lines 4—4 of FIG. 2.
Figure 5:
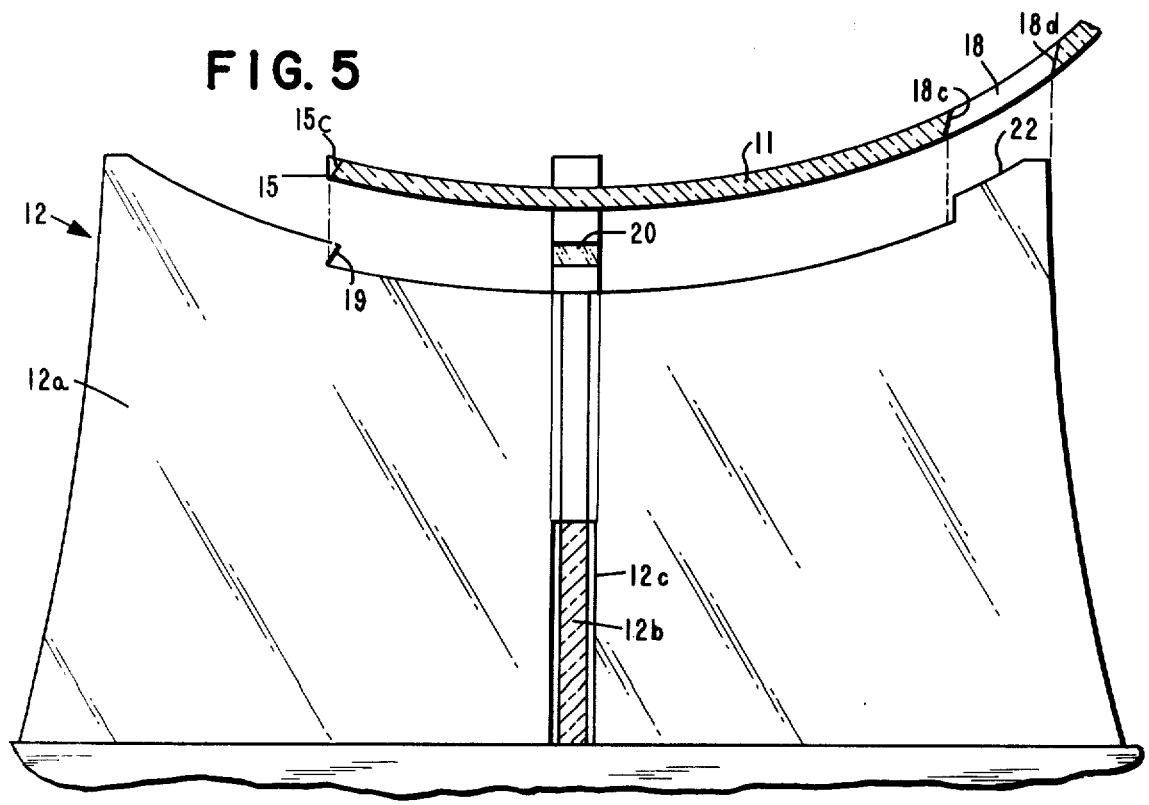
FIG. 5 is a section on lines 5—5 of FIG. 2.
Figure 6:
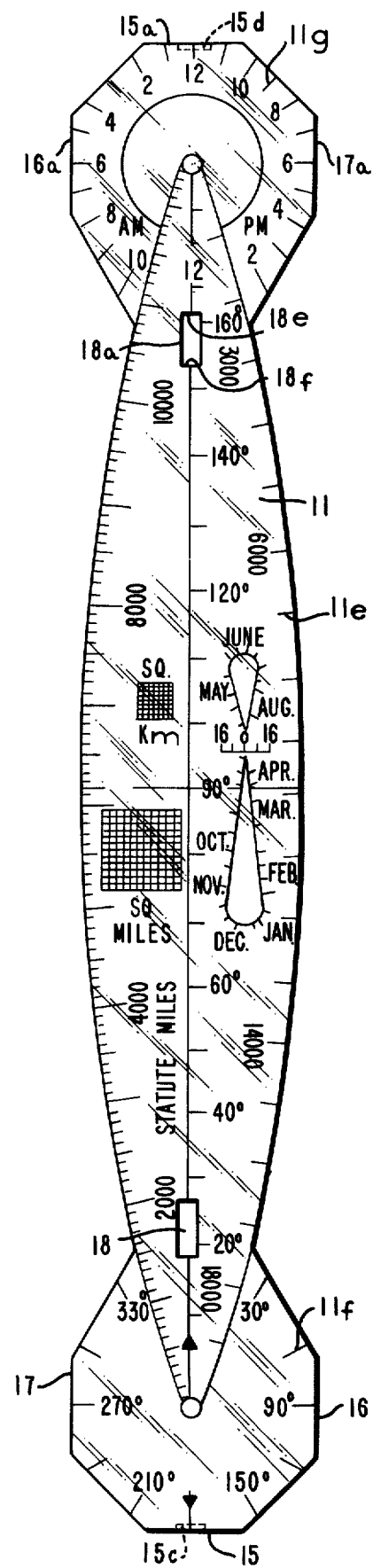
FIG. 6 is a plan view of the measuring band as straightened out to show the measuring indicia and the configurations of the end portions of the band with measuring indicia at the support stand cooperating and interfitting portions of the band.

As shown more clearly by FIGS. 2, 4 and 5 of the drawings, the interfitting-cooperating surfaces, such as the surfaces 15–18 of the band 11 and similar cooperating surfaces 19–22 of the stand 12, are shaped to provide a snap-fitting connection. More specifically, it will be noted that the surface 19 of the stand 12 is undercut while the cooperating surface 15 of the band 11 is beveled at 15c. Also, the cooperating surface 15a is beveled at 15d (FIG. 6). Similarly, the slot walls 18c and 18d, or slot walls 18e and 18f of the clasp band 11, which cooperate with the tongue 22 of the base 12 are beveled as shown to permit the clasp band 11 to be snap-connected to the base 12 by first inserting the end surface 15a beneath the undercut surface 19 and thereafter snapping the tongue 22 in the slot 18. Thus the clasp measuring band member 11, with or without a clasped globe 10, may be easily attached to or removed from the supporting base or stand 12 at either end of the band 11. As shown most clearly by FIGS. 4 and 5, the base or stand 12 may, if desired, be formed of two interfitting cross-members 12a and 12b having interfitting slots 12c and 12d so that the stand may be readily disassembled for shipment or storage purposes, as should be readily understood.

As most clearly shown by FIG. 4 of the drawings, the plane of the measuring band 11 is provided with a curvature 11a throughout, conforming to the curvature of the globe 10, so that when a globe is clasped by the band 11 there will be a close interfitting contact between the surface of the globe and all inner surface portions of the clasp measuring band 11. Thus smooth movement action between the globe and band is obtained when various manipulations of the band over the globe are made to obtain the desired measurements.

Figure 3:
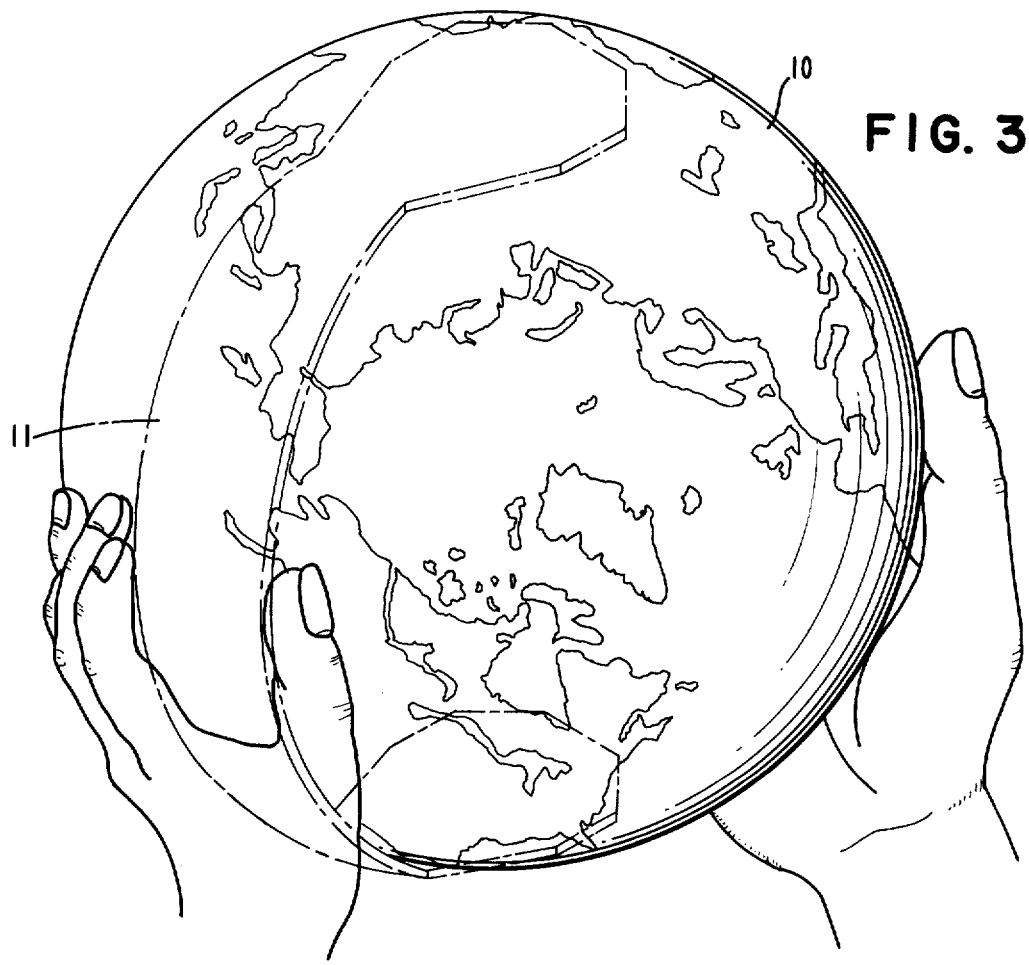
FIG. 3 is a perspective view showing the globe and measuring band as removed from the stand and hand held for manipulation of the measuring band around the globe.

As shown by FIG. 3 of the drawings, the globe 10, with measuring band 11 clasped thereabout, may be removed from the stand and held in the hands with the band 11 grasped by the user's left hand and movable over any portion of the globe. As shown most clearly by FIGS. 1 and 6 of the drawings, the measuring clasp band is preferably formed of transparent resilient plastic material and is provided with a variety of overlying measuring indicia. Since either end of the band 11 having the cooperating interfitting surfaces 15–18 is removable from the support stand 12, unique measuring indicia 11f may be provided and used at that end which, together with measuring indicia 11g at the other end of the band 11, provide measurement indicia for opposite poles of the globe 10. As shown by the drawings, each end of the measuring band is suitably shaped to accommodate the type of markings or indicia to be used relative to the opposite poles of the globe and each end of the band may be provided with cooperating interfitting surfaces, such as the surfaces shown at 15–19. Examples of the types of measuring indicia that may be applied to the measuring band 11 so that it may function as a transparent measuring overlay for the world globe 10 have been given in U.S. Pat. No. 3,100,353 and need not be further described herein.

Various modifications will occur to those skilled in the art. For example, the measuring band 11 can be removably attached to a supporting stand at positions intermediate the end or pole portions. Also, the precise form of the interfitting and cooperating surfaces of the band and stand may vary with or without a snap-fit engagement as desired. Although the band is preferably formed of transparent resilient plastic material, it is obvious that other materials may be suitable for such use and transparency is not a requirement if the markings are suitably arranged and sighting apertures provided in the band.

What I claim is:

1. A globe stand and measuring device comprising a base member and a C-shaped globe-supporting and retaining measuring band adapted to clasp a globe and formed of resilient material having a preformed curvature with a radius slightly less than the radius of the globe to be clasped, said band having measuring indicia thereon, said base member and an interfitting portion of said band having cooperating means to removably engage and support the band with a globe clasped thereby in a upright position on the base so that the band with a clasped globe may be removed from the supporting base for a desired manipulation of the measuring band and globe to thereby utilize measuring indicia in the vicinity of the interfitting band portion.

2. The invention of claim 1 in which the cooperating means of the band and base are formed with snap-fitting surfaces.

3. The invention of claim 1 in which the band is formed of transparent plastic material with overlying measuring indicia thereon.

4. The invention of claim 3 in which the cooperating means are formed with snap-fitting surfaces.

5. The invention of claim 1 in which the band is provided with a curvature through the plane of the band to approximate the curvature of the clasped globe to permit smooth close fitting movement of the band around the clasped globe.

6. The invention of claim 2 in which the band is provided with a curvature through the plane of the band to approximate the curvature of the clasped globe to permit smooth close fitting movement of the band around the clasped globe.

7. The invention of claim 3 in which the band is provided with a curvature through the plane of the band to approximate the curvature of the clasped globe to permit smooth close fitting movement of the band around the clasped globe.

8. The invention of claim 1 wherein said interfitting band portion is located at both ends of said band.

* * * * *